(12) United States Patent
Baligh et al.

(10) Patent No.: US 8,699,603 B1
(45) Date of Patent: Apr. 15, 2014

(54) ITERATIVE PRECODING SELECTION

(75) Inventors: Mohammad Hadi Baligh, Kanata (CA); Aaron Callard, Ottawa (CA); Jianglei Ma, Kanata (CA)

(73) Assignee: Avaya Inc., Basking Ridge, NJ (US)

( * ) Notice: Subject to any disclaimer, the term of this patent is extended or adjusted under 35 U.S.C. 154(b) by 1315 days.

(21) Appl. No.: 12/498,170

(22) Filed: Jul. 6, 2009

Related U.S. Application Data

(60) Provisional application No. 61/078,276, filed on Jul. 3, 2008.

(51) Int. Cl.
*H04B 7/02* (2006.01)
*H04L 1/02* (2006.01)

(52) U.S. Cl.
USPC .................................................... 375/267

(58) Field of Classification Search
USPC ......... 375/147, 148, 259, 260, 267, 295, 296, 375/299, 316, 341; 455/25, 69, 39, 443, 455/455, 500, 501, 561, 562.1
See application file for complete search history.

(56) References Cited

U.S. PATENT DOCUMENTS

| | | | |
|---|---|---|---|
| 2003/0142731 A1* | 7/2003 | Bergel | 375/147 |
| 2004/0233871 A1* | 11/2004 | Seki et al. | 370/331 |
| 2006/0270360 A1* | 11/2006 | Han et al. | 455/69 |
| 2007/0263734 A1* | 11/2007 | Seki | 375/259 |
| 2008/0207133 A1* | 8/2008 | Sato et al. | 455/67.11 |
| 2008/0247364 A1* | 10/2008 | Kim et al. | 370/336 |
| 2008/0247475 A1* | 10/2008 | Kim et al. | 375/260 |
| 2009/0080560 A1* | 3/2009 | Na et al. | 375/267 |
| 2010/0020702 A1* | 1/2010 | Wong et al. | 370/252 |

OTHER PUBLICATIONS

Naguib, A. F. et al., "Applications of Space-Time Codes and Interference Suppression for High Capacity and High Data Rate Wireless Systems," Proceedings of the Thirty-Second Asilomar Conference on Signals, Systems & Computers, 1998, pp. 1803-1810, vol. 2.

Van Nee, R. et al., "Maximum Likelihood Decoding in a Space Division Multiplex System," IEEE VTC, May 2000, pp. 6-10, Tokyo, Japan.

Wolniansky, P. W. et al., "V-BLAST: An ARchitecture for Realizing Very High Data Rates Over the Rich-Scattering Wireless Channel," Proceedings of IEEE ISSSE-98, Sep. 30, 1998, Pisa, Italy, IEEE.

* cited by examiner

*Primary Examiner* — Sam K Ahn
*Assistant Examiner* — Syed Haider
(74) *Attorney, Agent, or Firm* — Withrow & Terranova, PLLC

(57) ABSTRACT

The present invention allows a wireless communication system, such as a base station or user element to iteratively select precoding sets to apply to signals for transmission based on effective channel conditions.

32 Claims, 12 Drawing Sheets

ITERATIVE PRECODING SELECTION

This application claims the benefit of U.S. provisional patent application Ser. No. 61/078,276 filed Jul. 3, 2008, the disclosure of which is incorporated herein by reference in its entirety.

FIELD OF THE DISCLOSURE

The present invention relates to a system and process for precoding signals to compensate for channel conditions in a multiple-input multiple-output (MIMO) environment.

BACKGROUND

A MIMO system is generally characterized by a system that includes a transmitting device that has multiple (M) transmit antennas and a receiving device that has multiple (N) receive antennas. Unfavorable or changing channel conditions are significant impediments to achieving high data rates in today's wireless communication systems and are particularly problematic in MIMO systems. To address unfavorable channel conditions, designers often try to precondition, or pre-code, the signals to be transmitted from the various antennas in a manner that compensates for the condition of the channel. In general, the transfer function of the channel is determined and the inverse of the transfer function is applied to the signals to be transmitted. As such, the preconditioned signals theoretically arrive at the receive antennas as if there were ideal channel conditions.

In reality, channel conditions change quickly and the processing required to dynamically determine channel conditions and how to precondition the signals to be transmitted have traditionally taken a lot of time and processing power. Unfortunately, neither time nor processing power are abundant resources in a cellular communication environment, especially in the user elements. Accordingly, there is a need for a preconditioning process that is efficient and effective for cellular communication environments, including MIMO communication environments.

SUMMARY OF THE DETAILED DESCRIPTION

In one embodiment, a wireless communication system includes at least a plurality of antennas, receive circuitry, transmit circuitry, and control circuitry that is operatively associated with the receive circuitry and the transmit circuitry. The receive circuitry is adapted to receive weighted incoming pilot signals from a remote device via the plurality of antennas. The transmit circuitry is adapted to transmit weighted outgoing pilot signals to the remote device via the plurality of antennas. The control circuitry is adapted to iteratively determine effective channel conditions based on the weighted incoming pilot signals; select a precoding set based on the effective channel conditions; apply the precoding set to first pilot signals to provide the weighted outgoing pilot signals; and effect transmission of the weighted outgoing pilot signals via the transmit circuitry and the plurality of antennas.

In another embodiment, a wireless communication system includes at least a plurality of antennas, receive circuitry, transmit circuitry, and control circuitry that is operatively associated with the receive circuitry and the transmit circuitry. The transmit circuitry is adapted to transmit first weighted outgoing pilot signals and second weighted outgoing pilot signals to the remote device via the plurality of antennas. The receive circuitry is adapted to receive first effective channel condition information and second effective channel condition information from a remote device via the plurality of antennas. The first effective channel condition information is derived from the first weighted outgoing pilot signals that were previously transmitted from the transmit circuitry to the remote device. Similarly, the second effective channel condition information is derived from the second weighted outgoing pilot signals that were previously transmitted from the transmit circuitry to the remote device. The control circuitry is adapted to iteratively select a first precoding set based on the first effective channel conditions and the second effective channel conditions, select a second precoding set that is different than the first precoding set, apply the first precoding set to first pilot signals to provide the first weighted outgoing pilot signals, apply the second precoding set to the second pilot signals to provide the second weighted outgoing pilot signals, and effect transmission of the first weighted outgoing pilot signals with the second weighted pilot signals via the transmit circuitry and the plurality of antennas.

Those skilled in the art will appreciate the scope of the present invention and realize additional aspects thereof after reading the following detailed description in association with the accompanying drawings.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE EMBODIMENTS

The embodiments set forth below represent the necessary information to enable those skilled in the art to practice the invention and illustrate the best mode of practicing the invention. Upon reading the following description in light of the accompanying drawings, those skilled in the art will understand the concepts of the invention and will recognize applications of these concepts not particularly addressed herein. It should be understood that these concepts and applications fall within the scope of the disclosure and the accompanying claims.

Figure 1:
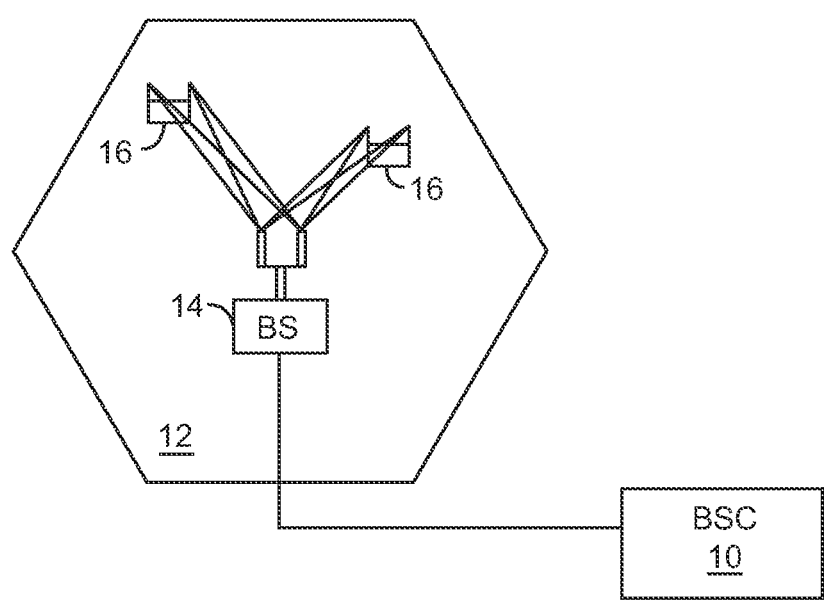
FIG. 1 is a block representation of a wireless communication system according to one embodiment of the present invention.

The present invention may be employed in a multiple-input multiple-output (MIMO) transmission system wherein there are multiple transmit antennas and multiple receive antennas. Prior to delving into the details of the invention, an overview of a MIMO environment is provided. With reference to FIG. 1, a basic MIMO wireless communication environment is illustrated. In general, a base station controller (BSC) 10 controls wireless communications within one or more cells 12, which are served by corresponding base stations (BS) 14. Each base station 14 facilitates communications with user elements 16, which are within the cell 12 associated with the corresponding base station 14. For the present invention, the base stations 14 and user elements 16 include multiple antennas to provide spatial diversity for communications. Notably, the base station 14 may be any type of wireless access point for cellular, wireless local area network, or like wireless system. The invention is particularly beneficial for Fourth Generation (4G) wireless systems, such as those that implement Wi-Max (Worldwide Interoperability for Microwave Access) and LTE (Long Term Evolution of the Universal Mobile Telecommunication System (UMTS)) standards.

Figure 2:
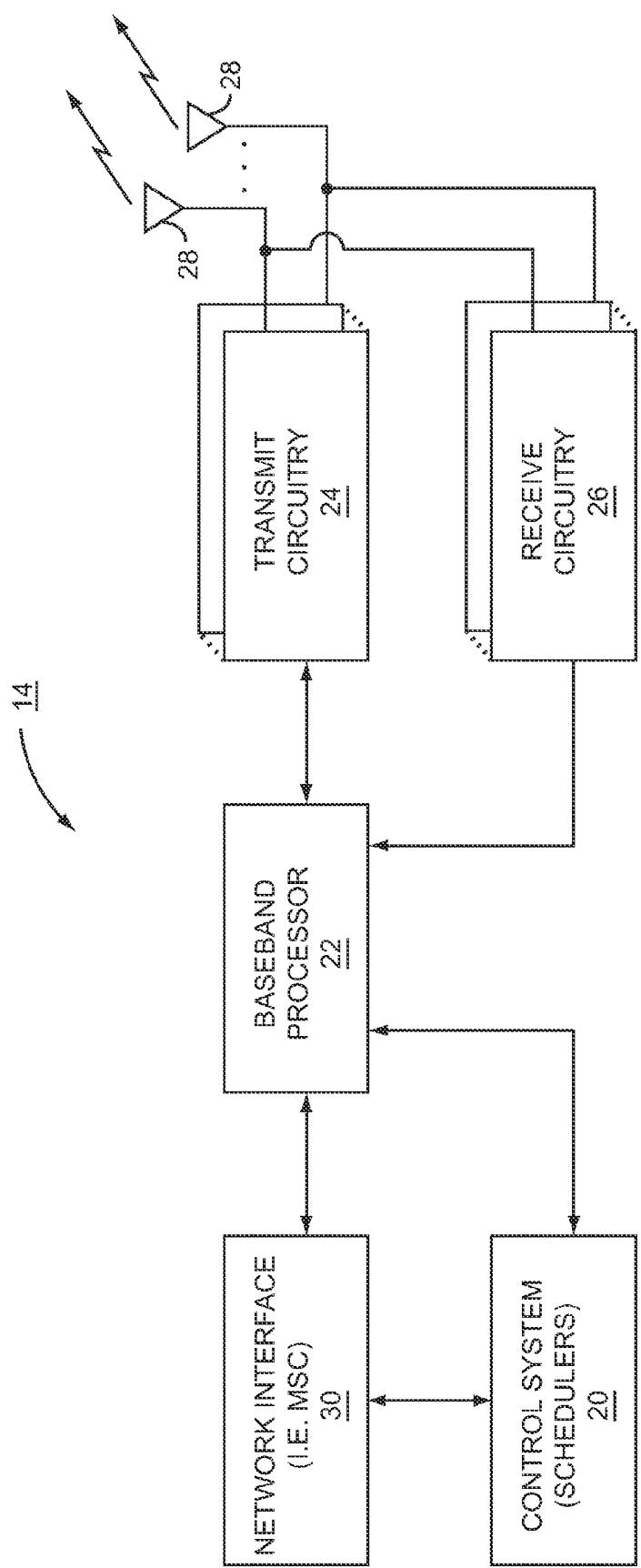
FIG. 2 is a block representation of a base station according to one embodiment of the present invention.

With reference to FIG. 2, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals through antennas 28 bearing information from one or more remote transmitters provided by user elements 16. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs). The received information is then sent across a wireless network via the network interface 30 or transmitted to another user element 16 serviced by the base station 14. The network interface 30 will typically interact with the base station controller 10 and a circuit-switched network forming a part of a wireless network, which may be coupled to the public switched telephone network (PSTN).

On the transmit side, the baseband processor 22 receives digitized data, which may represent voice, data, or control information, from the network interface 30 under the control of the control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). The multiple antennas 28 and the replicated transmit and receive circuitries 24, 26 provide spatial diversity. Antenna selection, modulation, and processing details are described in greater detail below.

Figure 3:
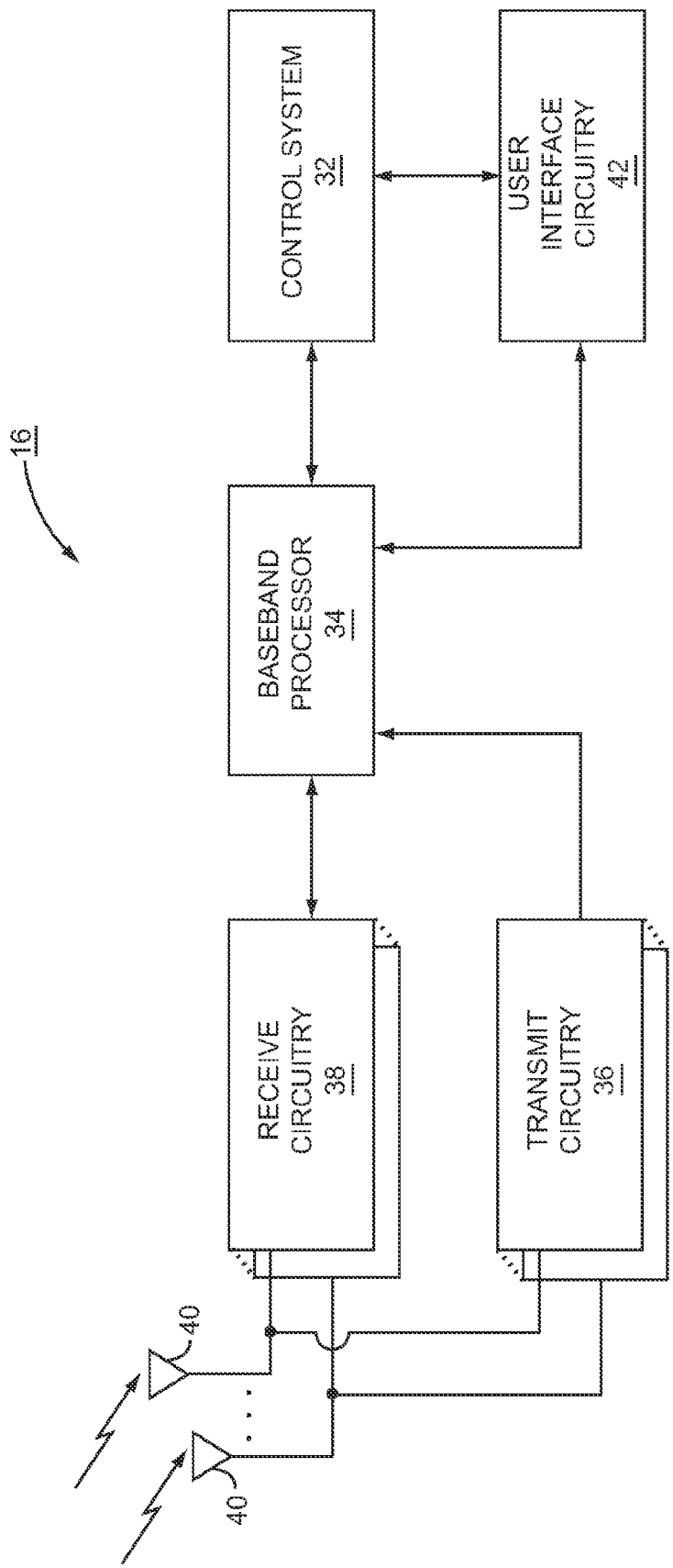
FIG. 3 is a block representation of a user element according to one embodiment of the present invention.

With reference to FIG. 3, a user element 16 configured according to one embodiment of the present invention is illustrated. Similarly to the base station 14, the user element 16 will include a control system 32, a baseband processor 34, transmit circuitry 36, receive circuitry 38, multiple antennas 40, and user interface circuitry 42. The receive circuitry 38 receives radio frequency signals through antennas 40 bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed on greater detail below. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). The multiple antennas 40 and the replicated transmit and receive circuitries 36, 38 provide spatial diversity. Modulation and processing details are described in greater detail below.

Figure 4:
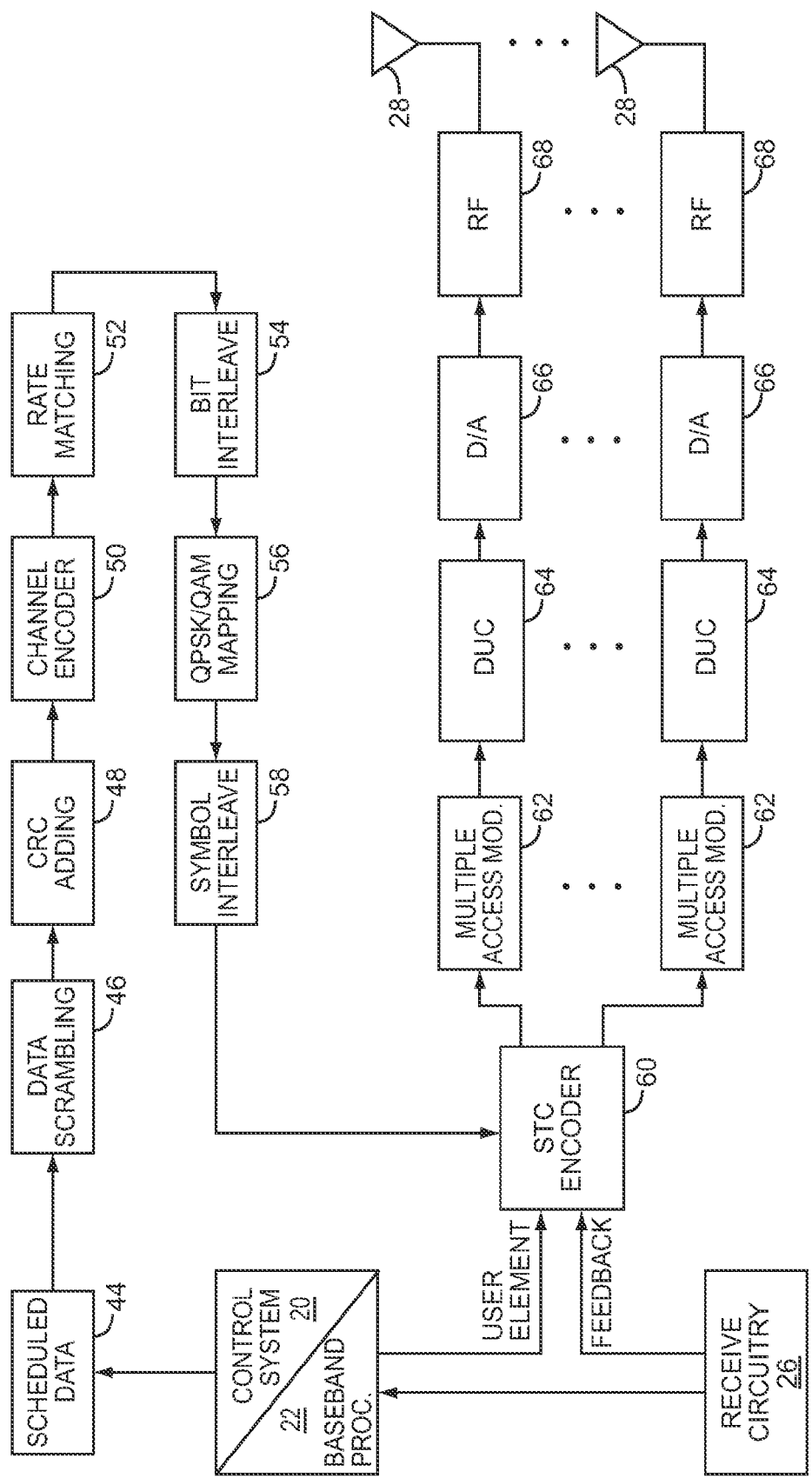
FIG. 4 is a logical breakdown of a transmitter architecture according to one embodiment of the present invention.

With reference to FIG. 4, a logical transmission architecture is provided according to one embodiment. The transmission architecture is described as being that of the base station 14, but those skilled in the art will recognize the applicability of the illustrated architecture for both uplink and downlink communications. Further, the transmission architecture is intended to represent a variety of multiple access architectures, including, but not limited to code division multiple access (CDMA), frequency division multiple access (FDMA), time division multiple access (TDMA), and orthogonal frequency division multiple access (OFDMA).

Initially, the base station controller 10 sends data 44 intended for a user element 16 to the base station 14 for scheduling. The scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the user element 16. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, a form of Quadrature Amplitude Modulation (QAM) or Quadrature Phase Shift Key (QPSK) modulation is used. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. Blocks of symbols are then processed by space-time code (STC) encoder logic 60. The STC encoder logic 60 will process the incoming symbols according to a selected STC encoding mode and provide n outputs corresponding to the number of transmit antennas 28 for the base station 14. Assume the symbols for the n outputs are representative of the data or pilot signals to be transmitted and capable of being recovered by the user element 16. For further information regarding space-time coding, see A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998; R. van Nee, A. van Zelst and G. A. Atwater, "Maximum Likelihood Decoding in a Space Division Multiplex System", IEEE VTC. 2000, pp. 6-10, Tokyo, Japan, May 2000; and P. W. Wolniansky et al., "V-BLAST: An Architecture for Realizing Very High Data Rates over the Rich-Scattering Wireless Channel," Proc. IEEE ISSSE-98, Pisa, Italy, Sep. 30, 1998 which are incorporated herein by reference in their entireties.

For illustration, assume the base station 14 has selected two of a number of antennas 28 (n=2) and the STC encoder logic 60 provides two output streams of symbols. Accordingly, each of the symbol streams output by the STC encoder logic 60 is sent to a corresponding multiple access modulation function 62, illustrated separately for ease of understanding. Those skilled in the art will recognize that one or more processors may be used to provide such analog or digital signal processing alone or in combination with other processing described herein. For example, the multiple access modulation function 62 in a CDMA function would provide the requisite PN code multiplication, wherein an OFDMA function would operate on the respective symbols using inverse discrete Fourier transform (IDFT) or like processing to effect an Inverse Fourier Transform. Attention is drawn to co-assigned application Ser. No. 10/104,399, filed Mar. 22, 2002, entitled SOFT HANDOFF FOR OFDM, for additional OFDMA details, and to RF Microelectronics by Behzad Razavi, 1998 for CDMA and other multiple access technologies, which are incorporated herein by reference in their entireties.

Each of the resultant signals is up-converted in the digital domain to an intermediate frequency and converted to an analog signal via the corresponding digital up-conversion (DUC) circuitry 64 and digital-to-analog (D/A) conversion circuitry 66. The resultant analog signals are then simultaneously modulated at the desired RF frequency, amplified, and transmitted via the RF circuitry 68 and antennas 28. Notably, the transmitted data may be preceded by or combined with pilot signals, which are signals, symbols, or the like that are known by the intended user element 16. The user element 16, which is discussed in detail below, may use the pilot signals for channel estimation and interference suppression and the header for identification of the base station 14.

Figure 5:
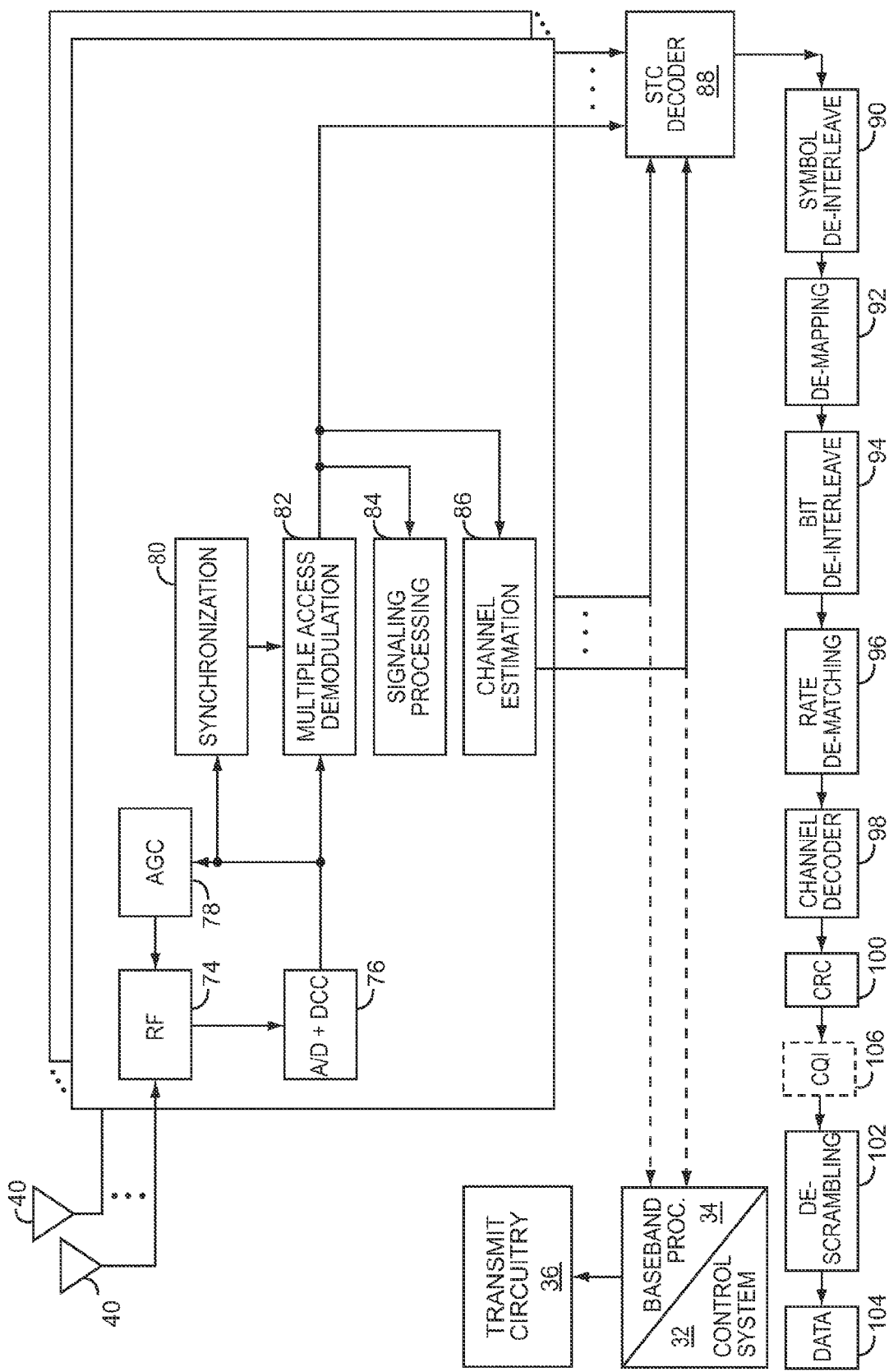
FIG. 5 is a logical breakdown of a receiver architecture according to one embodiment of the present invention.

Reference is now made to FIG. 5 to illustrate reception of the transmitted signals by a user element 16. Upon arrival of the transmitted signals at each of the antennas 40 of the user element 16, the respective signals are demodulated and amplified by corresponding RF circuitry 74. For the sake of conciseness and clarity, only one of the multiple receive paths in the receiver is described and illustrated in detail. Analog-to-digital (ND) conversion and downconversion circuitry (DCC) 76 digitizes and downconverts the analog signal for digital processing. The resultant digitized signal may be used by automatic gain control circuitry (AGC) 78 to control the gain of the amplifiers in the RF circuitry 74 based on the received signal level.

The digitized signal is also fed to synchronization circuitry 80 and a multiple access demodulation function 82, which will recover the incoming signal received at a corresponding antenna 40 at each receiver path. The synchronization circuitry 80 facilitates alignment or correlation of the incoming signal with the multiple access demodulation function 82 to aid in recovery of the incoming signal, which is provided to a signaling processing function 84 and channel estimation function 86. The signal processing function 84 processes basic signaling and header information to provide information sufficient to generate a channel quality measurement, which may bear on an overall signal-to-noise ratio for the link, which takes into account channel conditions and/or signal-to-noise ratios for each receive path.

The channel estimation function 86 for each receive path provides channel responses corresponding to channel conditions for use by an STC decoder 88 and the control system 32 as will be described further below. The symbols from the incoming signal and channel estimates for each receive path are provided to the STC decoder 88, which provides STC decoding on each receive path to recover the transmitted symbols. The channel estimates provide sufficient channel response information to allow the STC decoder 88 to decode the symbols according to the STC encoding used by the base station 14.

The recovered symbols are placed back in order using the symbol de-interleaver logic 90, which corresponds to the symbol interleaver logic 58 of the transmitter architecture. The de-interleaved symbols are then demodulated or de-mapped to a corresponding bitstream using de-mapping logic 92. The bits are then de-interleaved using bit de-interleaver logic 94, which corresponds to the bit interleaver logic 54 of the transmitter architecture. The de-interleaved bits are then processed by rate de-matching logic 96 and presented to channel decoder logic 98 to recover the initially scrambled data and the CRC checksum. Accordingly, CRC logic 100 removes the CRC checksum, checks the scrambled data in traditional fashion, and provides it to the de-scrambling logic 102 for de-scrambling using the known base station de-scrambling code to recover the originally transmitted data 104.

A channel quality indicator (CQI) may be determined based on the recovered data. An additional or alternative CQI function 106 may be provided anywhere along the data recovery path (blocks 90 through 104) to monitor signal-to-noise ratios, error rates, and like to derive information bearing on individual or overall channel quality. Additional information on one exemplary way to determine a CQI value is provided in co-assigned application Ser. No. 60/329,511, filed Oct. 17, 2001, and entitled "METHOD AND APPARATUS FOR CHANNEL QUALITY MEASUREMENT FOR ADAPTIVE MODULATION AND CODING."

The following describes the overall functionality of the present invention and refers to the primary device used for transmission as the transmitter and the device used for receiving as the receiver. At any given time depending on the direction of primary communications, the base station 14 and the user elements 16 may be a transmitter, receiver, or both.

As noted, a MIMO system is one where information is transmitted from M transmit antennas and received at N receive antennas. As such, there are multiple transmit channels associated with each antenna. The transfer function for each one of these individual channels is represented by $h_{ij}$, wherein i=1 through N and j=1 through M. The overall MIMO system can be expressed by:

$$y = H_{N \times M} x + n,$$  Eq. 1 wherein:

$x=[x_1 \ x_2 \ \ldots \ x_M]^T$, which represents the channel input;
$y=[y_1 \ y_2 \ \ldots \ y_N]^T$, which represents the channel output;
$n=[n_1 \ n_2 \ \ldots \ n_N]^T$, which represents channel noise; and $$H = \begin{bmatrix} h_{11} & h_{12} & \ldots & h_{1M} \\ h_{21} & h_{22} & \ldots & h_{2M} \\ \vdots & \vdots & \ddots & \vdots \\ h_{N1} & h_{N2} & \ldots & h_{NM} \end{bmatrix},$$

which represents a channel matrix of the individual channel transfer functions corresponding to actual channel conditions.

Figure 6:
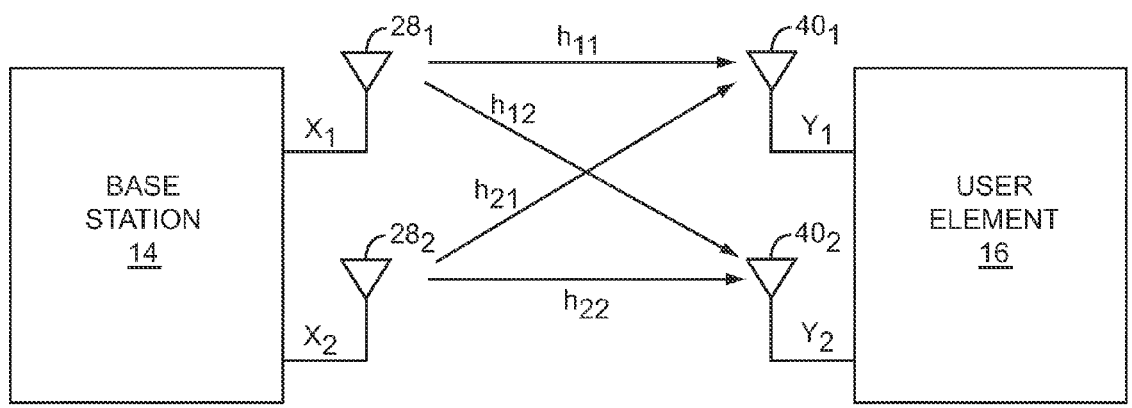
FIG. 6 illustrates an exemplary transmission diversity arrangement according to a first embodiment of the present invention.

An exemplary 2×2 MIMO system is represented in FIG. 6 to illustrate the transmission paths and channel transfer functions in a MIMO environment. Assume that the signals to be transmitted from the respective transmit antennas $28_1$ and $28_2$ are the channel input and are represented by $x_1$ and $x_2$. The transmitted signals $x_1$ and $x_2$ may represent pilot signals, space-time encoded data, or a combination thereof. As such, the signal $x_1$ is transmitted via antenna $28_1$ and the signal $x_2$ is transmitted from antenna $28_2$. Each of these transmitted signals $x_1$ and $x_2$ are received at both receive antennas $40_1$ and $40_2$. The signals received at each of the antennas $40_1$ and $40_2$ represent the channel output, or received signals $y_1$ and $y_2$. The received signals $y_1$ and $y_2$ are decoded in an attempt to recover the original pilot signals, space-time encoded data, or a combination thereof. As illustrated, there are effectively four independent channels between the transmitter and the receiver. The conditions of each of the four channels may be respectively represented by the channel transfer functions $h_{11}$, $h_{12}$, $h_{21}$, and $h_{22}$.

To compensate for the effects of the channel conditions, the signals to be transmitted from the different antennas may be individually predistorted to compensate for the various attenuation, gains, phase shifts, and the like imposed by the channel conditions. Such predistortion may be provided by applying a weighting factor to the signals wherein each weighting factor will preferably represent the inverse of the corresponding channel transfer function. As such, characterizing the channel conditions is often required to determine the weighting factors to apply to the signals to be transmitted. For the sake of clarity, the weighting factors are referred to as precoding values, which may be calculated dynamically or selected from a codebook that includes numerous precoding values.

With the present invention, an iterative process is employed to determine a desirable precoding value to apply to certain pilot and data signals being transmitted from a transmitter to a receiver. The following description outlines two embodiments. The first embodiment is particularly applicable to a time division duplex (TDD) system, while the second embodiment is particularly applicable to a Frequency Division Duplex (FDD) system; however either embodiment or any combination thereof may be applied to either TDD or FDD systems.

Figure 7A:
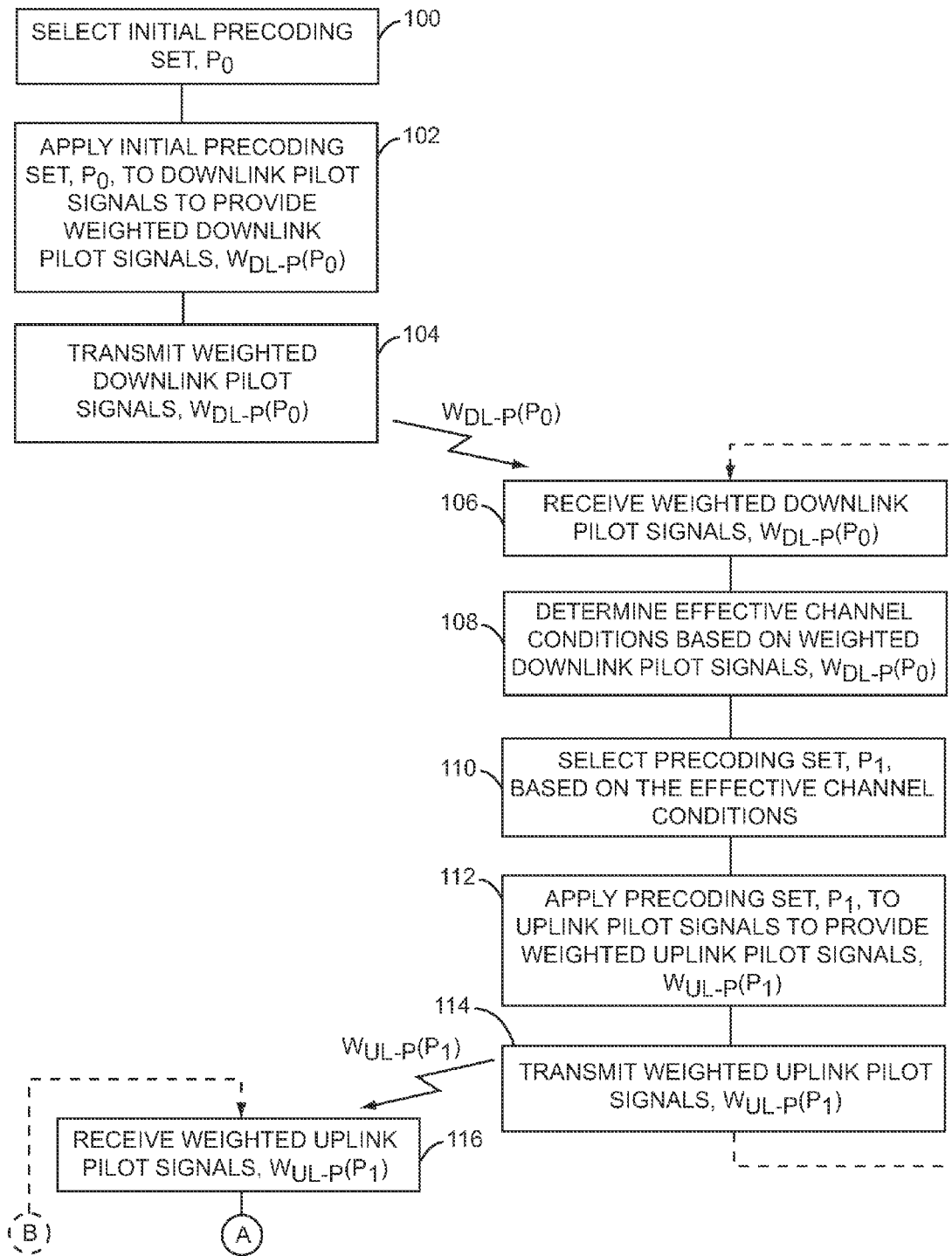
FIGS. 7A and 7B provide a flow diagram for a first iterative precoding process according to the present invention.
Figure 7B:
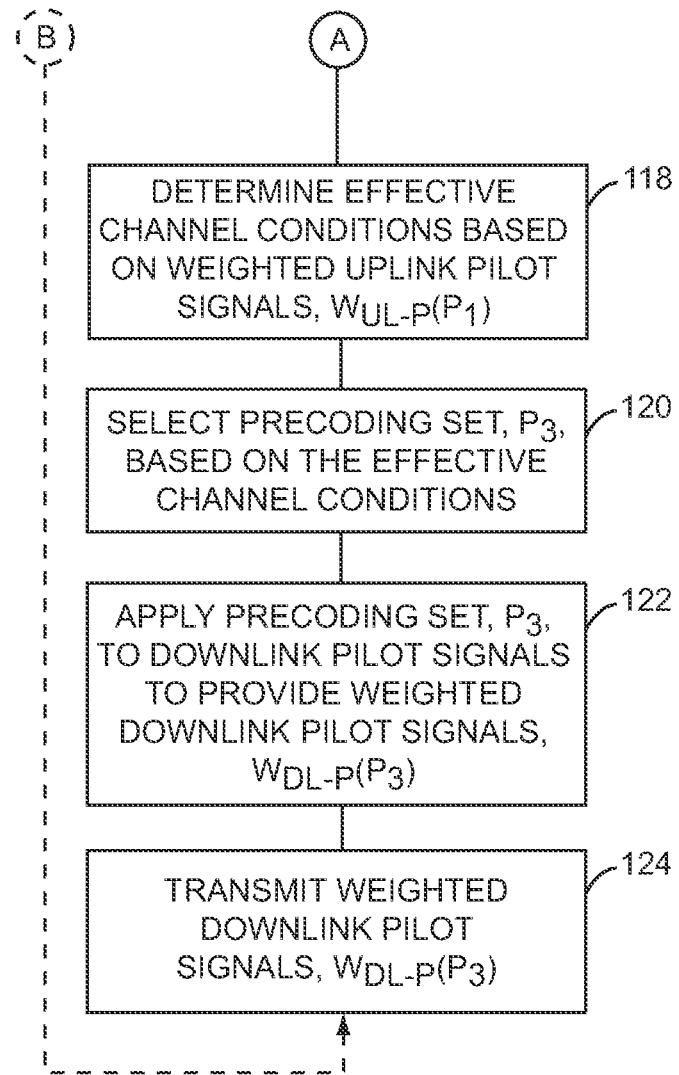

In the flow diagram of FIGS. 7A and 7B, an iterative precoding process is illustrated according to the first embodiment, which is employed in a TDD communication system. The flow diagram is divided into two columns, wherein each column represents a different communication device, such as a base station 14 and a user element 16. For purposes of illustration only, assume the device associated with the left-hand column of the flow diagram is the base station 14, and the device associated with the right-hand column of the flow diagram is a user element 16. Although not required, the following example allocates dedicated downlink pilot signals to the base station 14 and dedicated uplink pilot signals to the user element 16, wherein the uplink and downlink pilot signals are different from one another, as the base station 14 and user element 16 are communicating with each other. Within a TDD system, the present invention reduces pilot overhead and virtually eliminates feedback overhead with respect to precoding. These techniques are particularly beneficial for low speed or highly correlated channels.

Initially, the base station 14 will select an initial precoding set $P_0$ (step 100). The initial precoding set will include one or more precoding values to be applied to the different signals to be transmitted from the various antennas 28. The initial precoding set $P_0$ may be selected based on prior channel information, a default precoding set, or the like. The initial precoding set $P_0$ is applied to the downlink pilot signals to provide weighted downlink pilot signals $W_{DL-P}(P_0)$ (step 102). In essence, the pilot signals to be transmitted from the different antennas 28 will be weighted by the corresponding precoding values of the precoding set $P_0$. The weighted downlink pilot signals $W_{DL-P}(P_0)$ are then transmitted from the respective antennas 28 to the user element 16 (step 104). Through two or more of the antennas 40, the user element 16 will receive the weighted downlink pilot signals $W_{DL-P}(P_0)$ that were transmitted by the base station 14 (step 106). As those skilled in the art will recognize, the signals transmitted from the various antennas 28 of the base station 14 will generally combine in the transmission channel, and thus, will be received in varying combinations at each of the antennas 40 of the user element 16.

During the receiving process, the "effective" channel conditions for the transmission channel are determined based on the weighted downlink pilot signals $W_{DL-P}(P_0)$. The channel conditions are considered "effective" because, although the user element 16 is aware of the pilot signals (position, configuration, sequence, etc.), the user element 16 is not aware of how or the extent in which the pilot signals were weighted by the precoding values of the precoding set $P_0$. Since the pilot signals are weighted in a manner unknown to the user element 16, the user element 16 will determine the effective channel conditions based on its knowledge of the unweighted downlink pilot signals and the received signals (step 108). The effective channel conditions may be represented by the individual effective channel transfer functions $h_{ij}^e$, wherein the overall channel transfer function $H^e$ may be represented by an effective channel matrix. Assuming the unweighted pilot signals that are known by the user element 16 are the effective channel input, $x^e$, and the received signals are the actual channel output, $y^a$, the effective channel transfer function $H^e$ can be calculated as follows:

$$H^e = y^a/x^e. \qquad \text{Eq. 2}$$

Notably, the effective channel transfer function $H^e$ is not necessarily the actual channel transfer function $H^a$, because the actual channel output $y^a$ is a function of the weighted downlink pilot signals and the effective channel transfer function $H^e$ is calculated assuming the effective channel input $x^e$ is based on the unweighted downlink pilot signals instead of the weighted downlink pilot signals $W_{DL-P}(P_0)$.

Based on the effective channel conditions as derived from processing the weighted downlink pilot signals $W_{DL-P}(P_0)$, the user element 16 will select another precoding set $P_1$ (step 110). The precoding set $P_1$ may be selected from a codebook that has numerous predefined precoding sets. These precoding sets are preconfigured to take into consideration that effective channel conditions are being used for selection instead of actual channel conditions. The precoding set may be chosen to maximize, optimize, or enhance different metrics, such as capacity, post-processing signal-to-noise ratio, quality of service, interference, and the like, based on the detected channel conditions. Depending on processing capabilities, a precoding set may be dynamically calculated based on a predefined algorithm.

In one embodiment, whether selected from a codebook or dynamically calculated, the effective channel conditions may be compared with what is considered to be ideal channel conditions to determine an error value. The ideal channel conditions may vary based on designer preference and performance criteria. If the precoding sets in the codebook are configured to correspond to different error values or ranges thereof, an appropriate precoding set may be selected based on the corresponding error value. If a codebook is not used, the predefined algorithm may be configured to calculate a precoding set based on the error value. Alternatively, the codebook or predefined algorithm may be a direct function of the effective channel conditions.

Once the precoding set $P_1$ is selected in light of the effective channel conditions, the user element 16 will then apply the precoding set $P_1$ to uplink pilot signals to provide weighted uplink pilot signals $W_{UL\text{-}P}(P_1)$ (step 112). The weighted uplink pilot signals $W_{UL\text{-}P}(P_1)$ are then transmitted from the corresponding antennas 40 of the user element 16 to the base station 14 (step 114).

Notably, the process associated with steps 106 through 114 may be iteratively applied by the user element 16. With each iteration, different precoding sets may be selected by the user element 16 and applied to the uplink pilot signals prior to transmission. In one embodiment, this process may continue until the same precoding set is selected in successive iterations or the difference in successively selected precoding sets is deemed insubstantial. Alternatively, the iterative process may continue indefinitely. As actual channel conditions change, and thus effective channel conditions change, different precoding sets will be selected and applied to the weighted uplink pilot signals $W_{UL\text{-}P}$ based on the changing effective channel conditions. As will be seen, the base station 14 will provide a similar process for selecting precoding sets to apply to downlink pilot signals $W_{DL\text{-}P}$ based on the effective channel conditions, which are determined in light of the weighted uplink pilot signals $W_{UL\text{-}P}$.

Again, the weighted uplink pilot signals $W_{UL\text{-}P}(P_1)$ that are transmitted from the different antennas 40 of the user element 16 will combine in the transmission channel and be received by two or more of the antennas 28 of the base station 14 (step 116). During the receiving process, the base station 14 will determine the effective channel conditions for the transmission channel based on the weighted uplink pilot signals $W_{UL\text{-}P}(P_1)$ (step 118). Based on the effective channel conditions, such as the individual effective channel transfer functions $h_{ij}^e$ or the effective channel transfer function $H^e$, the base station 14 will select a precoding set $P_3$ (step 120). The precoding set $P_3$ may be selected from a codebook that has numerous predefined precoding sets. These precoding sets are preconfigured to take into consideration that effective channel conditions are being used for selection instead of actual channel conditions. The precoding set may be chosen to maximize, optimize, or enhance different metrics, such as capacity, post-processing signal-to-noise ratio, quality of service, interference, and the like, based on the detected channel conditions. Depending on processing capabilities, a precoding set may be dynamically calculated based on a predefined algorithm. The codebook or predefined algorithm in the base station 14 may be the same as that in the user element 16.

As provided in the user element 16, whether selected from a codebook or dynamically calculated, the base station 14 may compare the effective channel conditions with what is considered ideal channel conditions to determine an error value. If the precoding sets in the codebook are configured to correspond to different error values or ranges thereof, an appropriate precoding set may be selected based on the corresponding error value. If a codebook is not used, the predefined algorithm may be configured to calculate a precoding set based on the error value. Alternatively, the codebook or predefined algorithm may be a direct function of the effective channel conditions.

The base station 14 will then apply the precoding set $P_3$ to the downlink pilot signals to provide weighted downlink pilot signals $W_{DL\text{-}P}(P_3)$ (step 122). The weighted downlink pilot signals $W_{DL\text{-}P}(P_3)$ are then transmitted to the user element 16 (step 124). In one embodiment, the uplink pilot signals and the downlink pilot signals are dedicated pilot signals. Different pilot signals may be allocated for the uplink pilot signals used by the user element 16 and the downlink pilot signals used by the base station 14, such that at least certain pilot signals are not used by both the base station 14 and the user element 16.

As in the user element 16, the process associated with steps 116 through 124 may be iteratively applied by the base station 14. With each iteration, different precoding sets may be selected by the base station 14 and applied to the downlink pilot signals prior to transmission. In one embodiment, this process may continue until the same precoding set is selected in successive iterations or the difference in successively selected precoding sets is deemed insubstantial. Alternatively, the iterative process may continue indefinitely. As actual channel conditions change, and thus effective channel conditions change, different precoding sets will be selected and applied to the weighted downlink pilot signals $W_{DL\text{-}P}$ based on the changing effective channel conditions.

Figure 8:
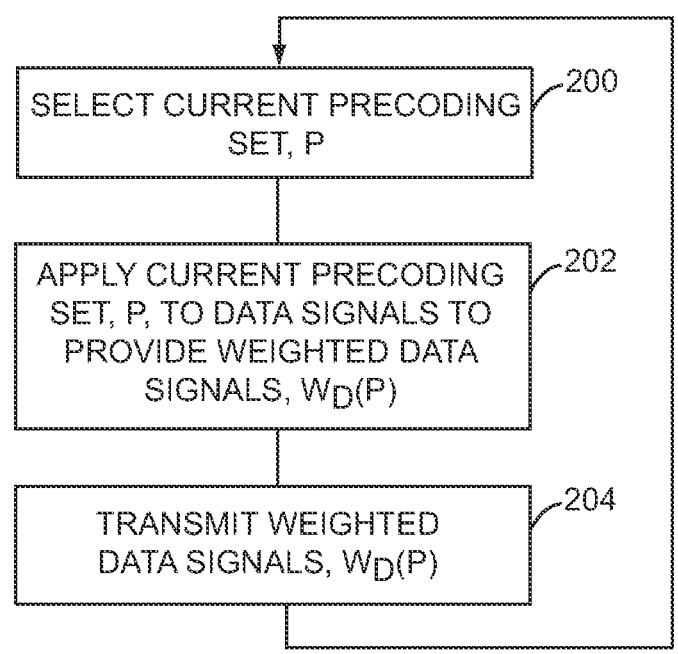
FIG. 8 provides a flow diagram for data transmission in association with the first iterative precoding process.

At any given time, the selected precoding set may be used to weight data signals to be transmitted between the respective devices while the iterative precoding process is taking place or after the iterative precoding process has converged on a desired precoding set. Since neither of the respective devices know the precoding set being applied by the other, a first precoding set that is selected by the base station 14 may be applied to the downlink data signals, while another select precoding set that is selected by the user element 16 may be applied to uplink data signals. An exemplary process is illustrated in FIG. 8, wherein the selected precoding set is applied to uplink or downlink data signals. Initially, the current precoding set P is selected (step 200) and applied to data signals to be transmitted to provide weighted data signals $W_D(P)$ (step 202). Once the precoding set is applied, the weighted data signals $W_D(P)$ are transmitted (step 204). A given precoding set may be applied to data and pilot signals at the same or substantially the same time by a given device.

Figure 9A:
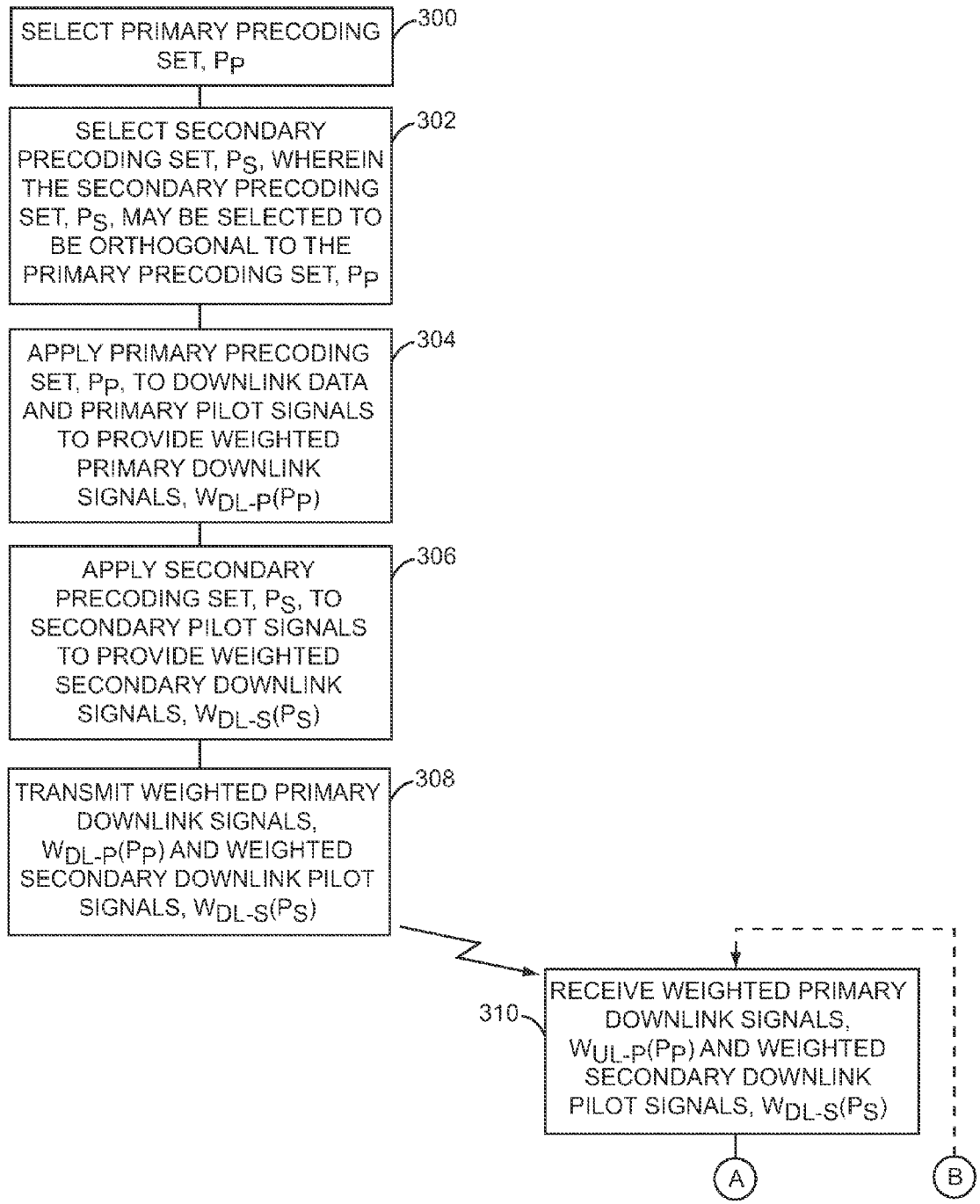
FIGS. 9A through 9C provide a flow diagram for a second iterative precoding process according to the present invention.
Figure 9B:
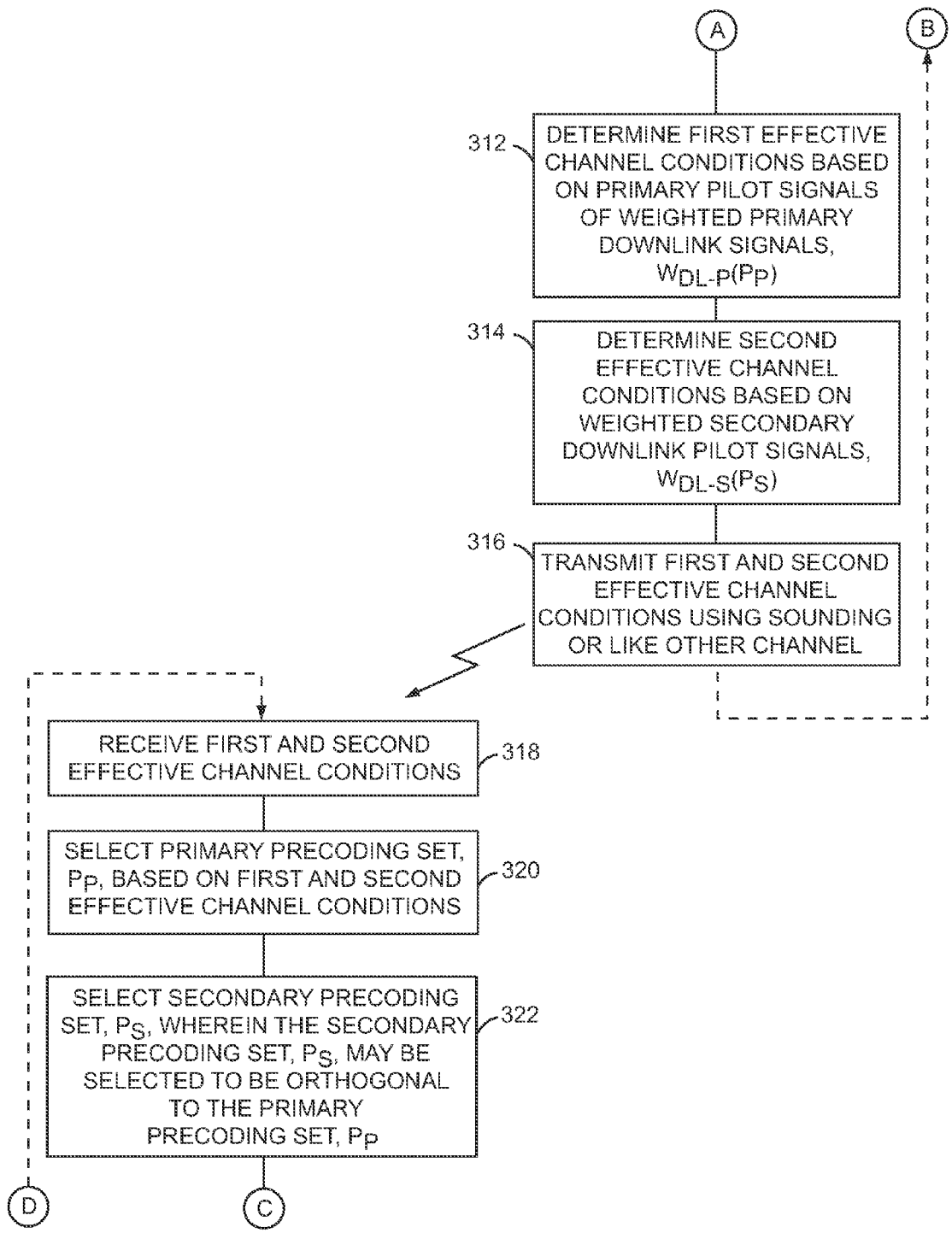
Figure 9C:
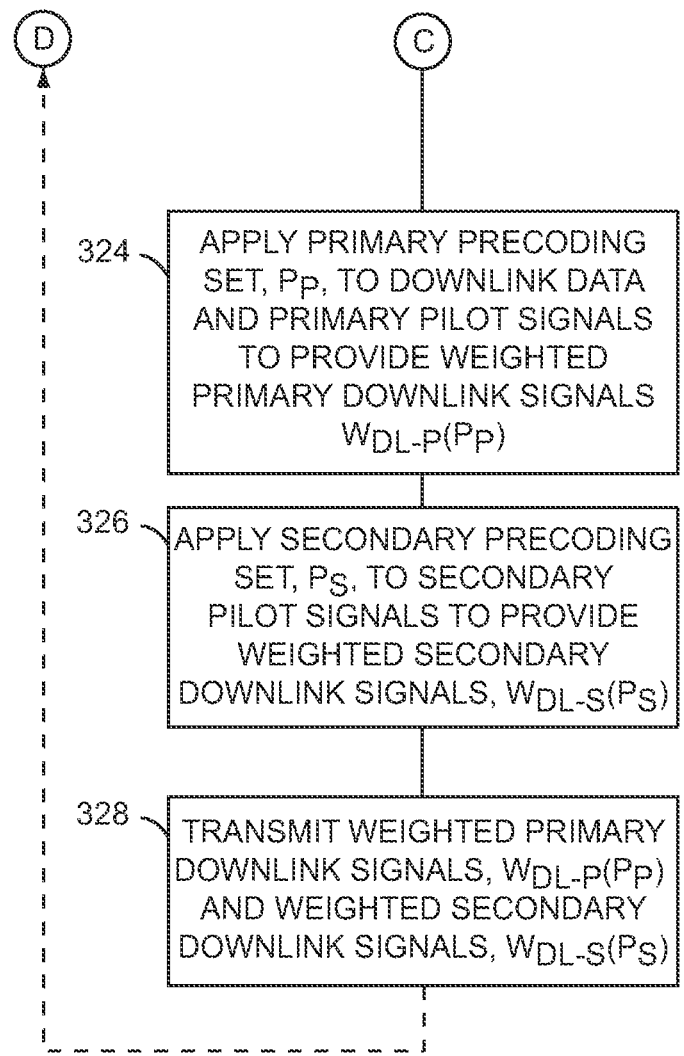

Turning now to the flow diagram of FIGS. 9A-9C, an alternative iterative precoding process is illustrated. As indicated above, this process may be applied in a TDD or FDD system; however, the present example is illustrated within an FDD system in which a base station 14 is in communication with a user element 16 over a wireless communication channel. Initially, assume the base station 14 selects a primary precoding set $P_P$ (step 300) as well as a secondary precoding set $P_S$, wherein the secondary precoding set $P_S$ is orthogonal to the primary precoding set $P_P$ (step 302). Notably, it is not required that the secondary precoding set $P_S$ be orthogonal to the primary precoding set $P_P$; however, it is preferred. Further, the term "orthogonal" is deemed to mean that the pilot signals, as weighted by the different precoding values of the precoding sets, will not or will minimally interfere with one another during transmission.

The primary precoding set $P_P$ is applied to the downlink data and the primary pilot signals to provide weighted primary downlink signals $W_{DL-P}(P_P)$, which will include both data and pilot signals (step 304). The secondary precoding set $P_S$ is applied to at least secondary pilot signals to provide weighted secondary downlink signals $W_{DL-S}(P_S)$ (step 306). The different pilot signals may employ different communication resources and remain orthogonal to one another. Further, the secondary pilot signals may be dedicated or shared as common pilot signals with the user element 16.

Next, the base station 14 will transmit the weighted primary downlink signals $W_{DL-P}(P_P)$ and the weighted secondary downlink pilot signals $W_{DL-S}(P_S)$ via the antennas 28 (step 308). The weighted primary downlink signals $W_{DL-P}(P_P)$ and the weighted secondary downlink pilot signals $W_{DL-S}(P_S)$ may be transmitted substantially concurrently or together.

Again, the various signals transmitted from the various antennas 28 will combine in the communication channel and be received in varying combinations at the different antennas 40 of the user element 16 (step 310). During the receive process, the user element 16 will determine first effective channel conditions having a first channel transfer function ($H_1$) based on the (weighted) primary pilot signals of the weighted primary downlink signals $W_{DL-P}(P_P)$ (step 312) as well as determine second channel conditions having a second channel transfer function $H_2$ based on the weighted secondary downlink pilot signals $W_{DL-S}(P_S)$ (step 314). In one embodiment, the first effective channel conditions are based on the (weighted) primary pilot signals of the weighted primary downlink signals $W_{DL-P}(P_P)$ and not the weighted secondary downlink pilot signals $W_{DL-S}(P_S)$. Similarly, the second effective channel conditions may be based primarily on the weighted secondary downlink pilot signals $W_{DL-S}(P_S)$ and not the (weighted) primary pilot signals of the weighted primary downlink signals $W_{DL-P}(P_P)$. Once the first and second effective channel conditions and are determined, the user element 16 may transmit the first and second effective channel conditions using appropriate sounding or like channel back to the base station 14 via one or more of the antennas 40 (step 316). The information providing the first and second channel effective conditions may represent the first and second channel transfer functions $H_1$ and $H_2$ or any other information sufficient to convey such effective channel information.

The process associated with steps 310 through 316, as provided by the user element 16, may be iteratively provided wherein the user element 16 or other communication device systematically receives the weighted primary downlink signals $W_{DL-P}(P_P)$ and weighted secondary downlink pilot signals $W_{DL-S}(P_S)$; determines the first and second effective channel conditions $H_1$ and $H_2$; and transmits the first and second effective channel conditions back to the base station 14 or other communication device.

The base station 14 will receive the first and second effective channel conditions (step 318), and based on both the first and second effective channel conditions as reported by the user element 16, the base station 14 will select a new primary precoding set $P_P$ (step 320). The base station 14 will also select a new secondary precoding set $P_S$ (step 322), wherein the secondary precoding set $P_S$ is orthogonal to the primary precoding set $P_P$. The secondary precoding set $P_S$ need not be selected based on either of the first and second effective channel conditions. However, in other embodiments the secondary precoding set $P_S$ may be selected based in part on the first effective channel conditions, the second effective channel conditions, or a combination thereof, alone or in association with other criteria.

The new primary precoding set $P_P$ is applied to the downlink data and the primary pilot signals to provide weighted primary downlink signals $W_{DL-P}(P_P)$, which will include both data and pilot signals (step 324). The secondary precoding set $P_S$ is applied to at least secondary pilot signals to provide weighted secondary downlink signals $W_{DL-S}(P_S)$ (step 326). Next, the base station 14 will transmit the weighted primary downlink signals $W_{DL-P}(P_P)$ and the weighted secondary downlink pilot signals $W_{DL-S}(P_S)$ via the antennas 28 (step 328).

The process associated with steps 318 through 328 may be provided in an iterative fashion, wherein the base station 14 or other communication device receives the first and second effective channel conditions from the user element 16 or other communication device and uses the first and second effective channel conditions to select a primary precoding set $P_P$. The primary precoding set $P_P$ is used to weight primary pilot signals and data signals for transmission to the user element 16 or other communication device. As indicated above, those skilled in the art will recognize that the functionality of the base station 14 and user element 16 may be swapped, such that the functionality of the base station 14 is provided by the user element 16 and the functionality of the user element 16 is provided by the base station 14. Further, any two communicating devices may provide reciprocating functionality, wherein they are each determining the effective channel conditions and reporting them, and at the same time using reported effective channel conditions for selecting a primary precoding set to use for weighting both primary pilot signals and data.

During the first few iterations of the precoding set selection for both the base station 14 and the user element 16, the selected precoding sets $P_P$ or $P_S$ may not be well matched with the existing channel conditions. For initialization, one or both of the devices may run through the first few iterations by exchanging primarily dedicated pilots (with possibly some common pilots) without exchanging data. The use of additional dedicated pilot signals may be employed for faster initialization. After the first few iterations, when the precoding sets $P_P$ and $P_S$ more accurately compensate for the effects of the channel conditions, data exchange may begin. Alternatively, data may be transmitted during the initial phase; however, with lower spectral efficiency than normal steady state transmission where the precoding sets $P_P$ and $P_S$ more closely match the channel conditions. The initialization phase may employ a set of common pilots to provide a designated starting point. Further, either side can send extra dedicated pilots. In general, better channel matching corresponds to using more additional pilot signals. The uplink pilot signals and the downlink pilot signals may be dedicated pilot signals. Different pilot signals may be allocated for the uplink pilot signals used by the user element 16 and the downlink pilot signals used by the base station 14, such that at least certain pilot signals are not used by both the base station 14 and the user element 16.

In either of these embodiments, both sides do not need to know the other side's receiver or antenna configuration. The present invention is applicable to multi-user downlink and multi-user uplink MIMO communications, wherein the signals from the different users may be separated and processed accordingly. Alternatively, a solution may be selected based on the signals from multiple users, such that an "optimal" solution is selected for the group, instead of a particular one of the group. The present invention is applicable to multi-link or multi-hop environments. Generally, in FDD systems, the communication channel is not reciprocal. Each side will preferably report channel conditions. Any "optimization" of the precoding set that is selected by either side can be independent.

The present invention is particularly beneficial in CDMA, TDMA, and upcoming OFDMA environments, which employ orthogonal frequency division modulation in multiple access environments. For OFDM modulation, the transmission band is divided into multiple, orthogonal carrier waves, which may be referred to as sub-carriers. Each carrier wave is modulated according to the digital data to be transmitted. Because OFDM divides the transmission band into multiple sub-carriers, the bandwidth per sub-carrier decreases and the modulation time per sub-carrier increases. Since the multiple sub-carriers are transmitted in parallel, the transmission rate for the digital data, or symbols, on any given carrier is lower than when a single carrier is used.

OFDM modulation often employs an Inverse Fast Fourier Transform (IFFT) on the information to be transmitted. For demodulation, the performance of a Fast Fourier Transform (FFT) on the received signal is required to recover the transmitted information. In practice, the Inverse Discrete Fourier Transform (IDFT) and Discrete Fourier Transform (DFT) are implemented using digital signal processing for modulation and demodulation, respectively.

Accordingly, the characterizing feature of OFDM modulation is that orthogonal sub-carriers are generated for multiple bands within a transmission channel. The modulated signals are digital signals having a relatively low transmission rate and capable of staying within their respective bands. The individual sub-carriers are not modulated directly by the digital signals. Instead, all sub-carriers are modulated at once by IFFT processing. For further information regarding OFDM, please see commonly assigned applications U.S. Ser. No. 09/977,540 filed Oct. 15, 2001, U.S. Ser. No. 10/104,399 filed Mar. 22, 2002, U.S. Ser. No. 10/261,739 filed Oct. 1, 2002, and U.S. Ser. No. 60/495,944 filed Aug. 18, 2003, the disclosures of which are incorporated herein by reference in their entireties.

Those skilled in the art will recognize improvements and modifications to the preferred embodiments of the present invention. All such improvements and modifications are considered within the scope of the concepts disclosed herein and the claims that follow.

What is claimed is:

1. A wireless communication system comprising:
   a plurality of antennas;
   receive circuitry adapted to receive weighted incoming pilot signals from a remote device via the plurality of antennas, the weighted incoming pilot signals generated by the remote device applying a remote precoding set to second pilot signals;
   transmit circuitry adapted to transmit weighted outgoing pilot signals to the remote device via the plurality of antennas; and
   control circuitry operatively coupled to the receive circuitry and the transmit circuitry, the control circuitry not aware of the remote precoding set applied to the second pilot signals to generate the weighted incoming pilot signals, the control circuitry configured to iteratively:
      determine effective channel conditions based on the weighted incoming pilot signals;
      select a precoding set based on the effective channel conditions;
      apply the precoding set to first pilot signals to provide the weighted outgoing pilot signals; and
      effect transmission of the weighted outgoing pilot signals via the transmit circuitry and the plurality of antennas.

2. The wireless communication system of claim 1 wherein the precoding set applied to the first pilot signals is not transmitted to the remote device.

3. The wireless communication system of claim 1 wherein the receive circuitry and the transmit circuitry provide multiple input multiple output (MIMO) communications.

4. The wireless communication system of claim 1 wherein the precoding set that is applied to the first pilot signals over multiple iterations changes in response to changes in actual channel conditions.

5. The wireless communication system of claim 1 wherein to select the precoding set based on the effective channel conditions, the control circuitry is further configured to determine an error value bearing on an amount the effective channel conditions differ from ideal channel conditions and select the precoding set based on the error value.

6. The wireless communication system of claim 5 wherein the control circuitry further comprises a codebook that comprises a plurality of precoding sets and corresponding error values, and to select the precoding set based on the effective channel conditions, the control circuitry is further configured to select from the codebook the precoding set that corresponds to the error value.

7. The wireless communication system of claim 5 wherein to select the precoding set based on the effective channel conditions, the control circuitry is further configured to calculate the precoding set based on the effective channel conditions using a defined algorithm.

8. The wireless communication system of claim 1 wherein the effective channel conditions differ from actual channel conditions by a factor substantially corresponding to the precoding set.

9. The wireless communication system of claim 1 wherein the precoding set is a plurality of weighting factors to be respectively applied to signals to be transmitted from the plurality of antennas.

10. The wireless communication system of claim 1 wherein the first pilot signals employ different resources than the second pilot signals.

11. The wireless communication system of claim 1 wherein the transmit circuitry and the receive circuitry are configured to transmit and receive according to Wi-Max standards.

12. The wireless communication system of claim 1 wherein the transmit circuitry and the receive circuitry are configured to transmit and receive according to Long Term Evolution standards.

13. The wireless communication system of claim 1 wherein application of the precoding set to the first pilot signals results in the weighted outgoing pilot signals transmitted from the plurality of antennas being weighted differently.

14. The wireless communication system of claim 1 wherein the control circuitry is further configured to:
   apply the precoding set that is currently selected to data signals to be transmitted to the remote device to provide weighted data signals; and
   effect transmission of the weighted data signals via the transmit circuitry and the plurality of antennas.

15. A wireless communication system comprising:
a plurality of antennas;
transmit circuitry configured to transmit first weighted outgoing pilot signals and second weighted outgoing pilot signals to a remote device via the plurality of antennas;
receive circuitry configured to receive first effective channel condition information and second effective channel condition information from the remote device via the plurality of antennas, the first effective channel condition information being derived from the first weighted outgoing pilot signals that were previously transmitted from the transmit circuitry to the remote device and the second effective channel condition information being derived from the second weighted outgoing pilot signals that were previously transmitted from the transmit circuitry to the remote device; and
control circuitry operatively coupled to the receive circuitry and the transmit circuitry and configured to iteratively:
select a first precoding set based on the first effective channel condition information and the second effective channel condition information;
select a second precoding set that is different than the first precoding set;
apply the first precoding set to first pilot signals to provide the first weighted outgoing pilot signals;
apply the second precoding set to second pilot signals to provide the second weighted outgoing pilot signals; and
effect transmission of the first weighted outgoing pilot signals with the second weighted outgoing pilot signals via the transmit circuitry and the plurality of antennas;
wherein the control circuitry is further configured to:
in an iteration of an iterative process, select a different first precoding set and a different second precoding set than in a previous iteration; and
discontinue the iterative process when a difference between the different first precoding set and a preceding first precoding set is not substantial and a difference between the different second precoding set and a preceding second precoding set is not substantial in successive iterations.

16. The wireless communication system of claim 15 wherein the first pilot signals employ different resources than the second pilot signals.

17. The wireless communication system of claim 15 wherein the first weighted outgoing pilot signals are substantially orthogonal to the second weighted outgoing pilot signals.

18. The wireless communication system of claim 15 wherein the control circuitry is further configured to apply the first precoding set to data signals and effect transmission of the data signals with the first weighted outgoing pilot signals.

19. The wireless communication system of claim 15 wherein the receive circuitry and the transmit circuitry provide multiple input multiple output (MIMO) communications.

20. The wireless communication system of claim 15 wherein to select the first precoding set based on the first effective channel condition information and the second effective channel condition information, the control circuitry is further configured to determine an error value bearing on an amount the first effective channel condition information differs from ideal channel conditions and select the first precoding set based on the error value.

21. The wireless communication system of claim 20 wherein the control circuitry further comprises a codebook that comprises a plurality of precoding sets and corresponding error values, and to select the first precoding set based on the first effective channel condition information and the second effective channel condition information, the control circuitry is further adapted to select from the codebook the first precoding set that corresponds to the error value.

22. The wireless communication system of claim 20 wherein to select the first precoding set based on the first effective channel condition information and the second effective channel condition information, the control circuitry is further configured to calculate the first precoding set based on the first effective channel condition information and the second effective channel condition information using a defined algorithm.

23. The wireless communication system of claim 15 wherein the first effective channel condition information differs from actual channel conditions by a factor substantially corresponding to the first precoding set.

24. The wireless communication system of claim 15 wherein the first precoding set is a plurality of weighting factors to be respectively applied to signals to be transmitted from the plurality of antennas.

25. The wireless communication system of claim 1, wherein the control circuitry is configured to, in an iteration of an iterative process, select a different precoding set than in a previous iteration.

26. The wireless communication system of claim 25, wherein the control circuitry is further configured to continue the iterative process when the different precoding set is selected in successive iterations.

27. The wireless communication system of claim 25, wherein the control circuitry is configured to discontinue the iterative process when a difference between precoding sets selected in successive iterations is not substantial.

28. The wireless communication system of claim 1, wherein the control circuitry is configured to, in an iteration of an iterative process, select a same precoding set as used in a previous iteration.

29. The wireless communication system of claim 28, wherein the control circuitry is further configured to discontinue the iterative process when the same precoding set is selected in successive iterations.

30. The wireless communication system of claim 15, wherein the control circuitry is configured to continue the iterative process when the different first precoding set and the different second precoding set are selected in the successive iterations.

31. The wireless communication system of claim 15, wherein the control circuitry is configured to, in a different iteration of the iterative process, select a same first precoding set and a same second precoding set as used in a previous iteration.

32. The wireless communication system of claim 31, wherein the control circuitry is configured to discontinue the iterative process when the same first precoding set and the same second precoding set are selected in the successive iterations.

* * * * *